United States Patent
Riedel et al.

(10) Patent No.: US 9,499,270 B2
(45) Date of Patent: Nov. 22, 2016

(54) SUPPLY MODULE FOR PASSENGER TRANSPORT VEHICLES

(75) Inventors: Christian Riedel, Bliedersdorf (DE); Wolfgang Fischer, Jork (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 857 days.

(21) Appl. No.: 13/524,537

(22) Filed: Jun. 15, 2012

(65) Prior Publication Data

US 2012/0292986 A1 Nov. 22, 2012

Related U.S. Application Data

(63) Continuation of application No. PCT/EP2010/069702, filed on Dec. 15, 2010.

(60) Provisional application No. 61/286,483, filed on Dec. 15, 2009.

(30) Foreign Application Priority Data

Dec. 15, 2009 (DE) .......... 10 2009 058 312

(51) Int. Cl.
*B60L 1/00* (2006.01)
*B60L 3/00* (2006.01)
(Continued)

(52) U.S. Cl.
CPC ......... *B64D 11/0015* (2013.01); *B60Q 3/0259* (2013.01); *B64D 11/00* (2013.01); *B64D 11/0693* (2013.01); *B64D 2011/0053* (2013.01);
(Continued)

(58) Field of Classification Search
CPC B60Q 3/0259; B64D 11/00; B64D 11/0015; B64D 2011/0053; B64D 2013/003; B64D 11/0693; Y02T 50/46
USPC .......................................... 307/9.1
See application file for complete search history.

(56) References Cited

U.S. PATENT DOCUMENTS 5,556,332 A 9/1996 Schumacher
5,651,733 A * 7/1997 Schumacher .......... B64D 11/00
362/471

(Continued)

FOREIGN PATENT DOCUMENTS

JP 2003556 A 1/1990
WO 2010086817 A1 8/2010

OTHER PUBLICATIONS

International Searching Authority, International Search Report dated May 31, 2011 for International Application No. PCT/EP2010/069702.

(Continued)

*Primary Examiner* — Jared Fureman
*Assistant Examiner* — Esayas Yeshaw
(74) *Attorney, Agent, or Firm* — Lorenz & Kopf LLP

(57) ABSTRACT

A supply module is provided for a passenger transport vehicle that includes, but is not limited to a first supply unit for supplying passengers with a first supply medium in a first supply area and a second supply unit for supplying passengers with a second supply medium in a second supply area. Furthermore, the supply module includes, but is not limited to a control unit which is configured to activate the first supply unit in a first subregion of the first supply area and to activate the second supply unit in a second subregion of the second supply area, based on a predeterminable seating configuration.

18 Claims, 12 Drawing Sheets

(51) Int. Cl.
*H02G 3/00* (2006.01)
*B64D 11/00* (2006.01)
*B60Q 3/02* (2006.01)
*B64D 11/06* (2006.01)
*B64D 13/00* (2006.01)

(52) U.S. Cl.
CPC ..... *B64D 2013/003* (2013.01); *B64D 2241/00* (2013.01); *Y02T 50/46* (2013.01)

(56) References Cited

U.S. PATENT DOCUMENTS

| | | | |
|---|---|---|---|
| 6,456,916 B1* | 9/2002 | Edgar | E05F 15/46 180/271 |
| 6,796,690 B2 | 9/2004 | Bohlander | |
| 6,964,481 B2* | 11/2005 | Pho | A47C 1/13 353/12 |
| 7,027,767 B2 | 4/2006 | de La Chapelle et al. | |
| 7,411,489 B1* | 8/2008 | Elwell | G08B 13/1645 307/116 |
| 7,722,192 B2* | 5/2010 | Huonker | B64D 11/06 340/945 |
| 8,166,506 B2 | 4/2012 | Callahan et al. | |
| 8,466,579 B2* | 6/2013 | Petitpierre | B60N 2/0244 307/9.1 |
| 2004/0002792 A1* | 1/2004 | Hoffknecht | G05B 15/02 700/295 |
| 2008/0068220 A1 | 3/2008 | Giesa et al. | |
| 2009/0112407 A1 | 4/2009 | Kneller et al. | |
| 2011/0278884 A1 | 11/2011 | Marchesi | |

OTHER PUBLICATIONS

German Patent Office, German Office Action dated Nov. 4, 2010 for German Patent Application No. 10 2009 058 312.2.
European Patent Office, European Office Action dated Apr. 28, 2016 for European Application No. 10 792 309.3.

* cited by examiner

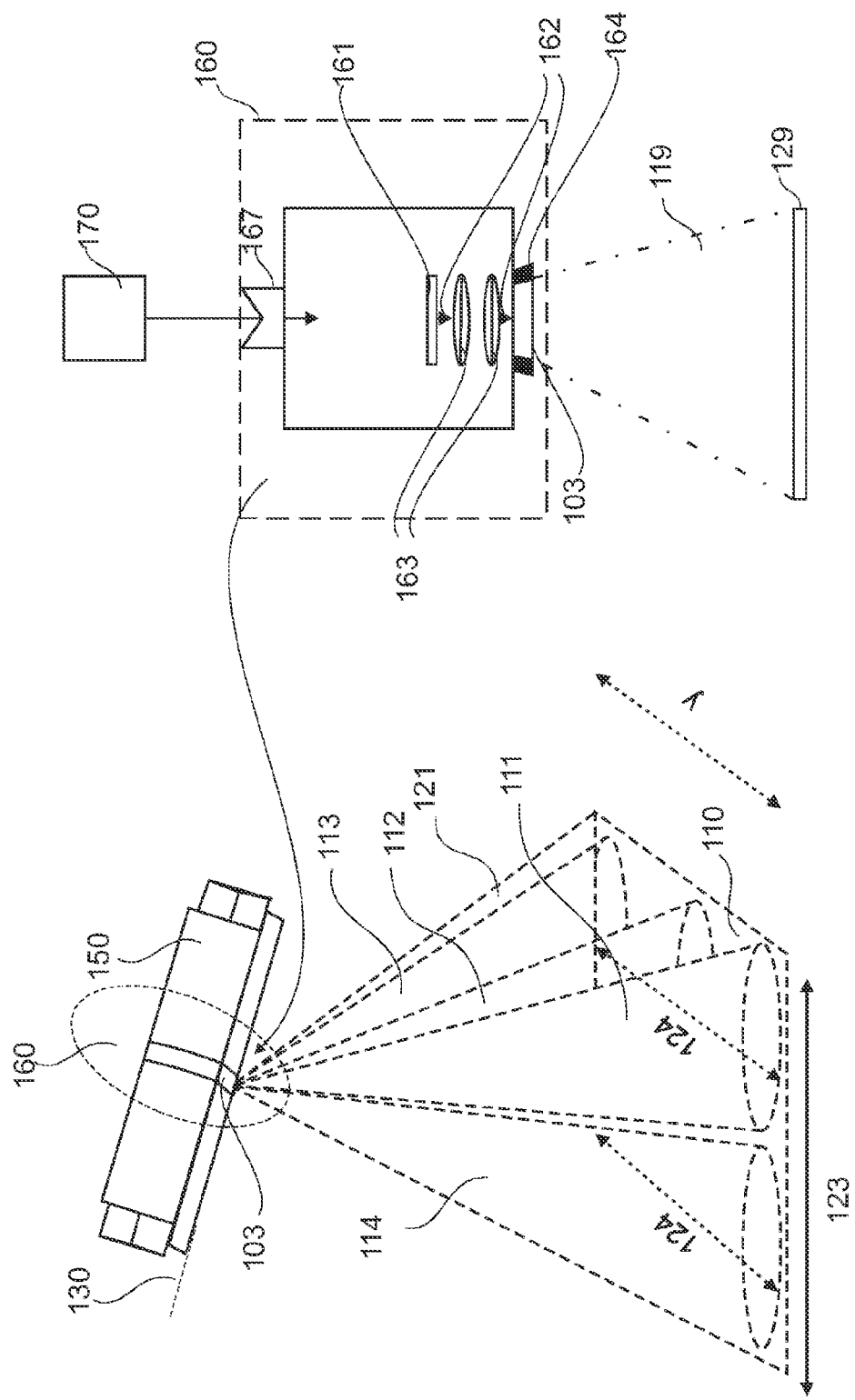

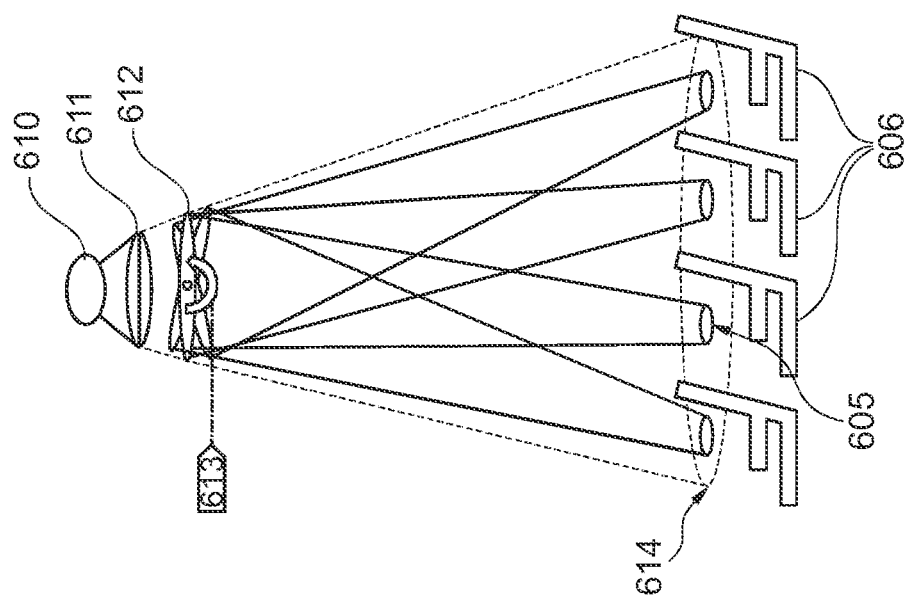
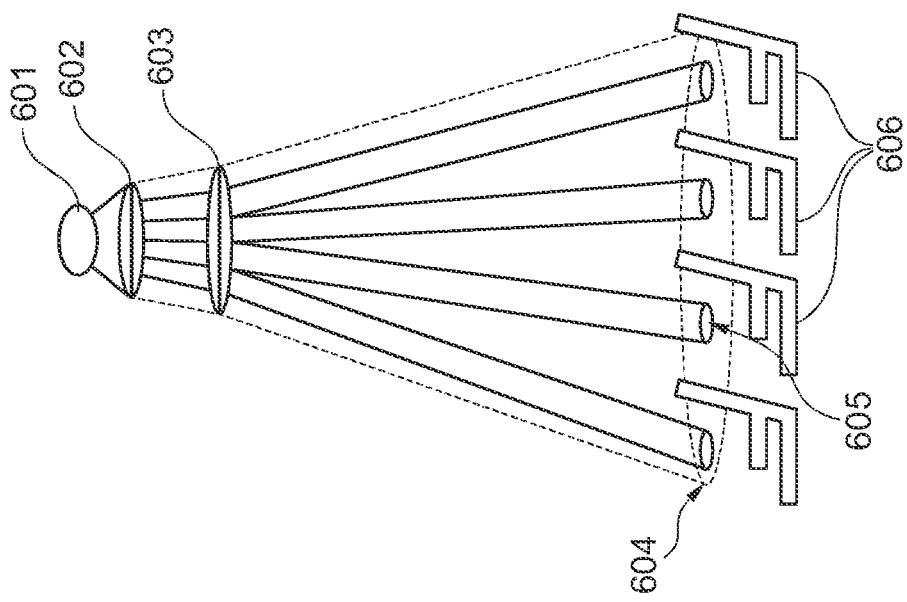

SUPPLY MODULE FOR PASSENGER TRANSPORT VEHICLES

CROSS REFERENCE TO RELATED APPLICATIONS

This is a continuation of International Application No. PCT/EP2010/069702, filed Dec. 15, 2010, which application claims priority to U.S. Provisional Patent Application No. 61/286,483, filed Dec. 15, 2009, and to German Patent Application No. 10 2009 058 312.2, filed Dec. 15, 2009, which are hereby incorporated by reference in their entirety.

TECHNICAL FIELD

The technical field relates to a supply module for passenger transport vehicles, in particular for aircraft, to an aircraft having a supply module, a method for operating a supply module for supplying occupants of a vehicle, a computer program element to implement said method and to a computer-readable storage medium.

BACKGROUND

For transport vehicles which are configured for passenger journeys, it is usual to make supply units available to the occupants of the vehicle. This form of supply module, known as a PSU (passenger service unit) integrates comfort, control or safety elements for one or for several seats and, therein, the supply modules comprise supply units, such as reading lights for each individual passenger, an attendant call light, information signs, loudspeakers or ventilation nozzles, seat row numberings, oxygen masks and oxygen generators which are combined into a PSU or into a supply module in a component assembly. These supply modules are usually arranged above the group of seats beneath the overhead compartment. The supply module may be connected for example to the air conditioning system, an oxygen line or a power supply, by a passenger supply channel (PSC).

DE 195 02 658 C1 discloses an arrangement for supplying passengers in a passenger cabin, particularly in an aircraft. The supply unit consists of comfort and control elements, such as reading lights, steward call button, loudspeakers, air nozzles and visual display elements, the supply unit being arranged beneath the overhead compartment. In order not to obstruct the lowering of the overhead compartment, the supply unit is arranged on a flexible, reboundable support arm such that the control and comfort elements of the supply unit may be accessed comfortably within reach of the passenger at any time.

From DE 43 01 681 a further passenger supply unit is known which is in the upper region of a cabin, in particular in an aircraft and which is moveable in the longitudinal direction of the cabin inside a shaft which is sunk into the ceiling covering of the cabin. In the cabin of a passenger aircraft such a supply unit is assigned to one or more passenger seats respectively. During the refit of a passenger cabin, the seat spacings are changed and thus the supply units are relocated so that the removal supports for connecting the airline to the air shower have to be moved at the same time.

For the supply modules or PSUs, standardized units are used that are dimensioned according to the dimensions of the interior fittings of the cabin. These supply modules that provide supply units such as display elements, circuit elements or connection elements for the supply of air or for energy or communication device, often need to be adapted to the current seating configuration, so that the relative arrangement of auxiliary functions, such as reading lights or flight attendant call signs or seat row signs has to be adapted depending on the seat occupancy. If the seats are reconfigured, the supply modules can be moved in a PSU shaft or "PSU rails" of a standardized width or can be replaced and, in this respect, gaps arising between the PSU units can be closed using cover plates or infill panels.

For example, reading lights can be moved mechanically or re-used with another standard unit having a greater number of reading lights. However, conventional reading lights then have to be adjusted manually in the respective new seat positions. Furthermore, there are different supply module variants, depending on how many seats, for example of a two, three or four-seat row, the supply module is supplying. The supply module can also differ when it is installed in the left-hand or right-hand supply channel. These necessary refits entail a correspondingly high expenditure in terms of time and cost during installation and refit. A more flexible supply module is preferred in order to minimize the logistical expense when the seat occupancy is reconfigured.

Therefore, there is a need to provide a supply module for passengers of transport vehicles which allows more flexibility and an improved use of the available area in the supply module as well as shorter production times. Furthermore, relatively heavy components are avoided and improved comfort for the passengers of the transport vehicle, in particular an aircraft, should be achieved, as well as a simplification of the attendant's work during the flight. Furthermore, an individual passenger allocation should be achieved. In addition, other needs, desirable features and characteristics will become apparent from the subsequent summary and detailed description, and the appended claims, taken in conjunction with the accompanying drawings and this background.

SUMMARY

A supply module is provided for a passenger transport vehicle, which module comprises a first supply unit for a supply with a first supply medium in a first supply area. Furthermore, the supply module comprises an interface to an external system for receiving a predeterminable occupancy situation and a control unit which is configured to activate the first supply unit in a first subregion of the first supply area, based on a predeterminable occupancy situation.

By activating subregions such as lighting subregions, different seat positions may be illuminated in a passenger aircraft without mechanical positioning of the supply module or manual adjustment of the supply unit being carried out. The supply module no longer has to be displaced in the supply module channel (PSC) as is conventional, but is always positioned in the same location.

In the following, the term "supply module" or "PSU" is used for a module which may be connected to a PSC and is arranged in standardized mounts above the passenger seat in or on the ceiling covering. Therein, typically combined in a supply module are services or functions, such as safety elements, for example oxygen masks and oxygen generators, comfort elements such as lights and air supply nozzles or air showers, passenger information signs and flight attendant call signs as well as a video display device. Further supply units such as acoustic signal units such as loudspeakers are possible.

The external system may be, for example, a cabin management system (CMS), also called CIDS (cabin intercommunication data system). In this manner, it is possible to integrate the control of the functionalities of the supply module into this system. For example, one of the functions of the CMS is, for example, the technical implementation of the desires of the user on the light-generating supply units, such that the angle or intensity may be set depending on the seats. For example, a flight attendant panel (FAP) may serve as a user-friendly user interface.

The CMS is generally already available in aircraft. The CIDS may obtain the current occupancy situation and cabin layout from the cabin assignment module (CAM), for example. The CAM is a storage region or storage module which may be configured as a plug-in. It may for example be installed in an FAP and contains inter alia the cabin layout.

According to a further embodiment, the first supply medium is selected from a group which consists of visual information, acoustic information, illumination, air, control surfaces and/or medical oxygen. In this manner, the supply medium may, for example, air, energy or a communication means, which may pass via a suitable connection into the supply module in the PSC. The supply area is understood as meaning an area which comprises several seating units which may comprise, for example, one to four seats in one row. One or two rows of seats may be supplied. The supply area may be, for example, a cuboidal space which is laterally delimited by the seating units to be supplied and by the associated legroom and extends as far as the ceiling of the cabin space of the transport vehicle or as far as the lower edge of the supply module. On the other hand, particularly in the case of illumination devices, the supply area may be conical with ellipsoid illumination surfaces or an anti-glare or optimized form of illumination for the passenger.

According to a further embodiment, the supply module comprises a second supply unit for supply with a second supply medium in a second supply area. The control unit is configured to activate the first supply unit in a first subregion of the first supply area and to activate the second supply unit in a second subregion of the second supply area based on a predeterminable occupancy situation.

The first and second supply areas may coincide or may partly overlap. A coinciding of the supply area means that all passengers in the supply area may be supplied with both the first supply medium and the second supply medium. If the at least first or second supply areas are not congruent, the supply areas may vary depending of the range of the respective supply media. Thus, in the case of an indicating device of the display, the supply area is restricted by the extent to which passengers or attendants may observe the display device from the viewing angle. The supply area of the air showers is predetermined by the set intensity, the ventilation grid and the deflectability of the air nozzle device. The range of the ventilation may also depend on the internal fittings, since a current of air may be deflected by a side wall, for example. In contrast, the supply area of control surfaces is restricted by the passengers' ability to reach them. If these control surfaces are touch-activated control surfaces which are arranged above the passengers on the cabin ceiling, this supply medium may only be reached by persons of a certain height. Operating these surfaces while partly standing up is usual and is dependent on the hat rack design.

Furthermore, the term "occupancy situation" relates to the seating configuration in a transport vehicle. These may be various transport vehicles, such as aircraft, buses, boats or trains which often transport different combinations of passengers and freight. For example, a variation may be made in air travel or in rail-bound vehicles between first class or business class and second class or economy class. Therefore, different seating plans or arrangements of installations such as toilets are produced, so that different occupancy situations result which are usually repeated and predeterminable.

The predeterminable occupancy situations may be saved in a central control unit which, in turn, may activate the supply module having two or more supply units according to the occupancy situation. For example, the system may contain information about the arrangement of the seats relative to one another, for example of seats A, B and C. This system may also contain information about the current spacings between the seats, or the respective positions to a fixed or relative point. In this manner, it is possible for the subregions to be activated which are required for adequately supplying each passenger with light, for example. For example, for three-seat rows, a single illumination device may be adjusted such that three light cones are made available.

Furthermore, for example, the numbering of the row of seats with the respective seat numbers or letters above the seats may be indicated by variable displays in the form of visual information as the second supply medium. Thus, it is no longer necessary to use printed back-lit panels which for example display seats or seatbelt fastening signals or no smoking signals. While conventional signal signs may only be changed by replacing the complete display units, items of safety information or warning functions or further items of information may be made available easily and quickly depending on the seating configuration with the aid of the controllable display units in the supply module. For example, the fasten seatbelt sign may be shown and hidden on the display surface after the take-off and landing phases and informative or entertainment contents, such as flight altitude, stock exchange prices or weather reports may be shown as tickers. The exemplary fasten seatbelt sign may be displayed in the form of three-dimensional animated videos or graphics in a manner clearly detached from entertainment content.

With the help of an external system such as CMS, the pilot, for example, may impart items of information acoustically using a loudspeaker integrated into the supply module. If the acoustic signals are supported by items of visual information, it is also possible, for example, to provide passengers with the safety-relevant information in several languages using appropriate subtitles. In this manner, hearing-impaired passengers may also be adequately informed about announcements by the flight attendants.

Items of information for passengers such as "No Smoking" or "Fasten Seatbelts" may be displayed as items of visual information. In addition to items of safety-relevant information, entertainment content such as complex information systems, for example in-flight entertainment or passenger flight information may be provided. In the display device mentioned, the display is configured such that it may present the safety elements as well as the entertainment elements on the same display, but clearly separate from one another. Flight attendant-based functions may be displayed with visual items of information in that illumination of the steward call button indicates that the passenger requires attention. Since the illumination system is connected via the interface to an external system, such as the CMS, the selected functions may be easily transmitted to the flight attendants. The stewards may immediately detect passenger-specific requests by this connection to a central system.

Supply units for acoustic signals may be provided in the form of a loudspeaker in a supply module. The range of the acoustic signals is usually across rows of seats so that it is sufficient to arrange loudspeakers only in every second supply module along the PSC in the supply module an internal processor unit which allows audio data, such as the MP3 data format, to be processed.

The supply means air is made available to the passengers when the air nozzles, activated according to the occupancy situation, are turned on via a corresponding operating device. The orientation of the air nozzle may be automatically set before the flight onto the corresponding passenger seat or onto the passenger's position as depending on the occupancy situation. Ventilation nozzles are usually provided for the maximum possible number of seats in one supply area. If the maximum occupancy situation of the supply area is not provided, only those ventilation nozzles are activated which have an associated passenger seat, so that in this case, there is an over-equipping of ventilation nozzles. Thus, the occupancy situation of economy class to business class may result in only two seats being installed in the same area instead of four seats. Consequently, only those nozzles are activated which are closest to these two seats. In a realization of the flexible PSU, an air shower supply is also possible in a separate supply channel.

A further possible supply medium is medical oxygen. This is provided in aircraft via passenger oxygen masks which, in the event of a drop of pressure in the cabin, fall from closable containers provided in the supply modules. The opening of the respective flap is likewise only activated depending on the number of occupied seats in the supply area. In this respect, the dropped-down oxygen masks may be easily reached by the respective passengers, so that they may be used by each individual passenger.

If a row of seats may comprise a maximum of four seats, four passenger oxygen masks are provided in the supply module. These masks always comprise an emergency oxygen supply hose, via which they are provided with medical oxygen by an oxygen connection attached to the supply module. Therein, the passenger oxygen masks and corresponding connection hoses are installed ready-for-use in the respective flaps.

The supply medium illumination may illuminate a plurality of seats by a single illumination unit in a first supply unit. In this manner, an individual reading light may be used by each individual passenger in a row of seats. As a light source for an individual illumination unit, a light emitting diode (LED), a light emitting diode matrix, a super luminescent light emitting diode (SLED) or a laser device may be provided.

An SLED is a light source having properties of an LED and a laser diode. Laser beams may be used as a light source in laser projection. In laser projection, grid-based or vector-based graphics may be directly projected onto subregion surfaces. The above-mentioned light sources may be combined with liquid crystal displays (LCD) or micromirror systems, and optical components. Advantageous configurations of the light sources are constructed so as to be very bright and compact. In this manner, a plurality of subregions may be illuminated by a single light source.

The lighting pattern or lighting subregion or light cones which illuminate the desired seats in subregions of, for example, the first supply area, may be generated as image data based on pixels. A plurality of geometric elements, but also graphic symbols, may be presented in this manner. The illumination unit of the supply module comprises an image data interface for receiving image data from an image data generator in order to project at least one partial illumination area or surface and/or image information, based on the image data. The image data generator is configured to generate lighting patterns, symbols, pictographs, characters, videos or other information as a function of a predeterminable occupancy situation.

With the help of a control unit, the image data may be loaded from a memory or externally, which image data implement illumination control data adapted to the current occupancy situation. Furthermore, the lighting patterns may be stored internally in the individual supply module units. Thus, passenger-specific adaptations, such as right/left (R/L) may be carried out in a simple manner. Therefore, a flexible adaptation to the respective layout or to the respective occupancy situation of the aircraft is possible.

Furthermore, the passenger may adjust the illumination unit via control surfaces. If the passenger selects a specific brightness or no light at all using a control element, this may be adjusted by a corresponding control element in the supply module. The control surfaces are configured, for example, as touch screens, tumbler switches or sensors. During the take-off and landing phases, individual lighting adjustments may be switched off and a constant lighting for all seats may be predetermined by an external central system.

The control surfaces may also be coupled with illumination surfaces. Thus, for example, the flight attendant call button may light up so that a flight attendant may easily detect that a passenger has activated the call button. Furthermore, an activation of this type may also be transmitted to an FAP via the connection to a central external system, so that the flight attendants may receive this information even if they are not looking in the direction of the relevant row of seats.

While the lighting as well as visual information may supply an entire row of seats as the possible supply area by a single supply unit per supply module, supply media such as air and medical oxygen are to be provided respectively for each individual seat of the row. In this manner, for a cabin layout with occupancy of fewer seats than the maximum possible number in a supply area, there is an over-equipping of air nozzles and oxygen masks or generators. Supply media such as items of visual information may be displayed or projected in a variable manner in a suitable display region. Therein, items of important passenger information, such as the requirement to fasten seatbelts or no smoking signs may also be displayed. Control surfaces may also be activated in a variable manner and made available to each individual passenger.

According to a further embodiment, the first supply area and the second supply area are configured such that they are consistent. In this way it may be ensured that each individual passenger in a supply area may be supplied with all supply units, integrated into the supply module, and with the corresponding supply media, irrespective of the occupancy situation. This also includes the possibility that for several passengers in one supply area, a single display unit is provided which may be seen by all the passengers in a row of seats at the same time. Furthermore, it is possible to provide an over-equipping of supply media or functions or parts such that a suitable device or function or supply medium is located within the range of every passenger in any seat position.

For the configuration of the reading lights, it is possible that any seat position and up to four seats is illuminated by a single reading light. With the help of additional functions which allow items of information to be transmitted by a light cone and projection techniques, seat numbers or video images may be displayed to the passengers. Furthermore, partial illumination areas of the supply area may not only relate to seats or tray tables, but also to the side walls or aisle areas. Corresponding illumination areas may be activated, for example, during the landing and take-off phases or during other situations which require the inside of the cabin to be fully illuminated.

To reduce weight, it is also advantageous to use a single flat display which may be seen by passengers in the entire row of seats. Air showers may be configured such that they may be swiveled or have a diffuser or air divider so that two seated passengers may be supplied with one air nozzle.

The selected arrangement of comfort circuit elements or safety elements in the supply module may depend on the type of aircraft used and on the rows of seats which are installed (for example ten abreast) or on the flight route (short haul or long haul). For a refit, the display elements or control surfaces may simply be adapted electronically. Therein, the compact supply module may provide supply units adapted to the clients.

According to an embodiment, a supply unit comprises a display device which is configured to display symbols, pictographs, characters, videos or other items of information depending on the predeterminable occupancy situation. In this manner, information data may be easily visualized for the passenger. For example, with an OLED (organic light-emitting diode) display or a projected image, color videos or other information and entertainment services may be made available to the passenger. Via an interface to a control unit, it is possible to access a memory which is provided on-board for storing information data. Via a control unit, the passenger or flight attendant persons may select a desired data set and visualize it on the display device. Stationary or moving images may be involved here, optionally with subtitles or appropriate dubbing. For example, the passenger himself may be able to retrieve information concerning a current flight position or an altitude position of the aircraft and to visualize it. Furthermore, it is possible to present entertainment programs, such as games or children's programs on the display.

According to a further embodiment, a supply unit comprises at least one interactive contact surface which is configured to activate at least one control surface depending on the one predeterminable occupancy situation. An interactive contact surface may be arranged, for example, directly connected to a display device. Therein, conventional buttons may be replaced by touch screens or interactive contact surfaces.

Furthermore, the display surface and the contact surface may be combined by configuring the display surface such that it is sensitive to touch. If the entire display surface is provided to be touch-sensitive, interactive contact surfaces may be formed at random points by a corresponding marking by the display. The size of the interactive contact surfaces or of the display may be varied depending on the number of seats to be supplied. For example, if two seats are supplied in the supply area, it is possible to arrange larger screen surfaces and interactive contact surfaces than is the case when four or more seats are supplied with the same interactive display. Therein, the control surfaces are dependent on the number of controllable supply units or call buttons. Via a suitable touch panel, in the case of two seats to be supplied, two flight attendant call buttons, for example, may be installed and two buttons for reading lights may be realized. Furthermore, it is possible for each individual control surface to be allocated its own interactive contact surface.

According to a further embodiment, a supply unit comprises at least one control surface which is configured to transmit activation by capacitive sensors, resistive sensors, inductive sensors, infrared sensors or other scanners. Therein, scanners may be data detection devices which may register and transmit external inputs. Using infrared sensor technology, it is possible, for example, to detect the approach of, for example, an index finger to a control element without mechanical switches. Furthermore, capacitive, resistive or inductive sensors may be used which allow control elements to be activated by a scanning methodology. Control elements of this type may easily be kept clean. A correspondingly far-reaching infrared sensor, combined with a virtual projected control surface, may supply the passenger with a control surface element at the height of the armrest or the tray table.

According to a further embodiment, the supply module comprises an electronics unit with a memory element which is configured to store at least one predeterminable occupancy situation. Therein, the electronics unit may be an interface and supply unit, known as a passenger interface and supply adapter (PISA), which is used as a monitoring and control unit for the supply module. The PISA may allow the input of information on the one hand via an airline-specific interface or via standard interfaces. Furthermore, during the flight it is possible to obtain updated data via the interface, which data originated from the avionics system of the aircraft and which may, for example, provide the passenger with data such as flight altitude or outside temperature.

The PISA, which comprises a central processing unit (CPU), may also be used in a decentralized manner. In this manner, at least one supply unit may be controlled independently of the central unit. The PISA has a small construction and a low power consumption. For controlling supply units having a higher power consumption such as illumination units, the PISA may be connected to driver stages. The control unit for an illumination unit may be integrated into the control electronics of the PISA. In this manner, a plurality of illumination units or projection devices may be efficiently controlled by each supply module. Furthermore, the control unit may comprise a multiplex device for controlling an illumination unit, which is configured to illuminate this illumination unit in several configurations with respect to the different subregions.

A storage medium may store items of information such as predeterminable occupancy situations which, for example, may be loaded on the ground into the storage medium according to the arranged seating configuration. The necessary information about the cabin seating plan may also be obtained from the CMS.

According to a further embodiment, a supply unit comprises an illumination unit which is configured to light partial illumination areas or regions based on a predeterminable occupancy situation. In this manner, the supply module may illuminate one or more illumination areas of any shape within the respectively defined supply area using a single illumination unit. The light source of the illumination unit may be a single white LED which generates a very intense light with a low power consumption. Therein, the lighting pattern depends on the number of seats. By a suitable electronics and control unit, the partial illumination areas may control a plurality of aperture angles, directions, illumination intensities, colors and/or shapes of the illumination in the respective supply area. Setting angles, for example, may be adjusted centrally via the CMS or individually at each supply module. Therein, the adjustment of the illumination unit, for example switching on or off or color, brightness, dimming, may be performed by the passenger. The individual adjustments may be carried out via the aforementioned control surfaces.

Lighting patterns corresponding to the seating configurations may be saved on a suitable storage element of the electronics unit for the illumination device. Furthermore, these lighting patterns may be adapted to the individual positions of the supply modules with respect to the cabin, for example whether the supply module is arranged on the left-hand side or on the right-hand side.

An internal processing unit with memory may control an individual illumination unit over a two-seat row, so that for example two adjacently arranged illumination areas may be activated per tray table at mealtimes. In this manner, a plurality of seats may be illuminated by a single illumination unit. For example, it is possible for an area measuring approximately 1 m by 1 m to be adequately lit by a single illumination unit. Costs may be saved and weight may be reduced by the use of a single illumination unit. At the same time, the assembly times for these illumination units may be reduced in the final assembly line (FAL).

According to a further embodiment, the illumination unit is configured as a miniature projection device. A miniature projection device or pico projector is very small and compact and has an overall height of approximately 10 cm or less. These projectors use powerful light sources such that the illumination power is sufficient for a usable illumination region of approximately 100 cm×100 cm. Due to the compact construction, weight and space may be saved. Of the entire illumination region, only part is used for individual seat illumination, while the rest is not illuminated. The regions not in use may be masked. If an illumination unit is not required, this supply unit is not activated.

According to a further embodiment, the miniature projection device or pico projector comprises at least one light modulation element, the light modulation element being selected from the group consisting of: a digital light processor (DLP) having a plurality of micromirrors; liquid crystal displays (LCDs); liquid crystal on silicon (LCoS); and micro-mechanical systems (MEMS).

The above-mentioned electro-optical devices may be used for modulating the light. Therein, attention is paid to the use of small components. In DLP technology, digital micromirror chips are used which have a high quantity of micromirrors having an edge length of a few mm to a few μm. Light diffraction may also be carried out on an optical grating. This method is used in MEMS.

LCoS displays are usually very small and as micro displays they may have edge lengths of a few mm. Despite the small dimensions thereof, LCoS displays may have more than two million pixels and may generate resolutions of approximately 1600×1200 pixels. LCDs may also generate high resolutions of this type in a miniature LCD projector despite small dimensions.

According to a further embodiment, a supply unit comprises an illumination unit which is configured to project image information with at least one activated partial illumination surface. In this manner, image information and image data may be projected by front or rear projection. Furthermore, pixel-based image data may be projected in any two-dimensional form onto a partial illumination surface in a locally differentiated manner. The shape of the adjustable light cone or subregion depends merely on the stored image data.

For receiving image files or image data, an image data generator may be provided, wherein the illumination unit comprises an image data interface for receiving the image data. Based on the image data received by the image data generator, lighting patterns, symbols, pictographs, characters, videos or other information may be generated as a function of a predeterminable occupancy situation.

To produce different light cones, a grid method may be used, as is conventional in laser projection. In this manner, animated pictographs may be presented which may have a flexible size or position. Seat numbering, for example, is mentioned as an item of image information. The seat numberings may be projected onto the respective seat surface. As soon as the passengers have boarded the aircraft, the seat numbering illumination may be switched off centrally by the cabin management system and the illumination unit may be used for other displays. Shortly before landing or take-off or during turbulence, notifications may be used such as "Fasten Seatbelt" or the like, such as a notification requesting that passengers should return to their seats. Pre-programmed items of information could include, for example, welcoming the passenger by name. Functionalities of this type are of added value to passengers and may be used in particular for customer-oriented airlines.

According to a further embodiment, the interface of the supply module for receiving and sending data may be coupled with an external system. The external system comprises a CMS.

In this manner, it is possible, for example, for a data transmission system to be used which is already present in the aircraft, for example the CMS. The items of information or data are transmitted by a data bus system. In turn, this data bus system may receive current data via wireless transmission technology, for example satellite technology such as Satcom.

Data such as configuration data of the supply module may be fed into the data bus system inside the aircraft via the interface and a main computer of the CMS. The storage medium used may include storage media which are normally used here, such as CD ROMs, memory cards and USB sticks. The use of the CMS also enables the flight attendants to select or input information. This may be done, for example via a control panel with an additional keyboard or a touch screen of the FAP. The information may be allocated to a classification or individual seat occupancy by a corresponding processing and control unit or a control and monitoring unit which is integrated into the CMS. In this respect, the control and monitoring unit and the processing and control unit may be combined in one appliance unit.

According to a further embodiment, an interface of the supply module is connected to a local control unit in a computer module. This embodiment allows a control of the supply module which is independent of an external control unit. In this manner, the passenger and flight attendant-based functions may be performed by an internal processing and memory unit. In this way, wiring tasks during refits are no longer necessary and an outbound interface is only provided when data is transmitted on the ground for maintenance or for a refit. The costs of a cabin refit may be further reduced in this manner. This embodiment with an internal computer is particularly suitable for supply units which may be easily controlled and are not dependent on current data. The data which are kept ready for the passenger for general retrieval may be loaded into an internal memory at the beginning of the flight. Thus, for example music or games programs may be loaded onto the supply module.

According to a further embodiment, the electronic unit is arranged in the supply module and comprises a control unit, in order to control at least one supply unit and a miniature projection device. By a local electronic unit such as the PISA, the external system may be unloaded, since control may take place independently via an interface according to suitable presets and the receipt of the occupancy situation. Furthermore, the control electronics of at least one miniature projection unit may be integrated into the local PISA electronics unit. Several illumination units may be controlled by one PISA control electronics unit. This efficient control saves space and may be controlled both locally and by an external system.

According to a further embodiment, an aircraft having a supply module is provided, the external system comprising the CMS, which is configured to control or to output data to the interface and to receive. Furthermore, an aircraft is provided with a supply module having at least a first and a second supply unit and an interface to a control unit, wherein the aircraft comprises a CMS which is configured to output data to the interface and to receive data and to activate the supply units based on a predeterminable occupancy situation.

The connections to the CMS may simplify the passenger adaptation and a refit no longer takes place mechanically by moving or replacing the modules. As the result of a suitable electronic control, for example different reading light positions may be adapted to the corresponding seating layouts. The supply module is also suitable for reducing costs and installation procedures in the FAL. Furthermore, maintenance costs may be reduced through the use of flexible supply modules and operating costs may also be reduced. Since the supply module may be supplied by a single data bus system, it is possible to reduce the wiring in the PSC, thereby allowing weight to be reduced.

According to a further embodiment, a method for operating a supply module for supplying occupants of a vehicle comprises the following steps: receiving data from an external system with respect to a predeterminable occupancy situation, activating a first supply unit of the supply module for a supply with a first supply medium in a first subregion of a first supply area by a control unit based on a predeterminable occupancy situation. Optionally, as a further step, a second supply unit of the supply module for a supply with a second supply medium in a second subregion of a second supply area may be activated by a control unit based on the received data.

In this manner, a plurality of supply units may be made available to the passengers with a single module. Therein, it is not necessary to activate each supply unit. Overhead videos may optionally be offered to the passengers by a suitable supply unit which is configured as a display unit. In this respect, different display devices and display techniques may be used.

A further advantage is that the supply module is easy to clean, particularly because control surfaces may be used which allow a combination of the display and interactive contact surfaces by specific appropriate techniques. Thus, for example, a display surface may have interactive subregions which function in the manner of a touch screen or a touch panel. Furthermore, it is possible to fit the illumination units which are integrated into the supply module with lenses, the edges of which may be illuminated. This peripheral illumination may indicate which illumination units may be activated with the given seating configuration.

Depending on budget, it is possible for relatively small or relatively large displays to be used, for example displays consisting of OLEDs, or also efficient LED projectors. The control of the items of information may be governed via a suitable control terminal, such as an FAP. The pilot may also activate important pictographs, such as the requirement to fasten seatbelts via the CMS.

According to a further embodiment, a computer program element is provided which, when executed by a processor, is configured to implement the method according to the invention. In this manner, pre-programmed illumination data, for example, may be activated for lighting patterns corresponding to the seat occupancy. The computer program element may be configured to repeatedly activate the illumination unit with respect to the differing light cones by a multiplex device. According to a further embodiment, a computer-readable storage medium is provided on which the computer program element according to the invention is stored.

Furthermore, it is pointed out that the above features or steps of the method may also be combined. The combination of the above features or steps may also lead to interactive effects and outcomes which go beyond the individual effect of the corresponding features, even if this is not explicitly described in detail. In the following, exemplary embodiments of the invention are described with reference to the following drawings.

BRIEF DESCRIPTION OF THE DRAWINGS

FIG. 1b shows a schematic view of a further embodiment of a supply module having a supply unit with the supply medium of light for a two-seat row;

FIG. 1c schematically shows a data projection device as an embodiment of the supply unit of FIG. 1b;

FIG. 6a and FIG. 6b schematically shows two methods of optical control;

DETAILED DESCRIPTION

The following detailed description is merely exemplary in nature and is not intended to limit application and uses. Furthermore, there is no intention to be bound by any theory presented in the preceding background or summary or the following detailed description.

Figure 1A:
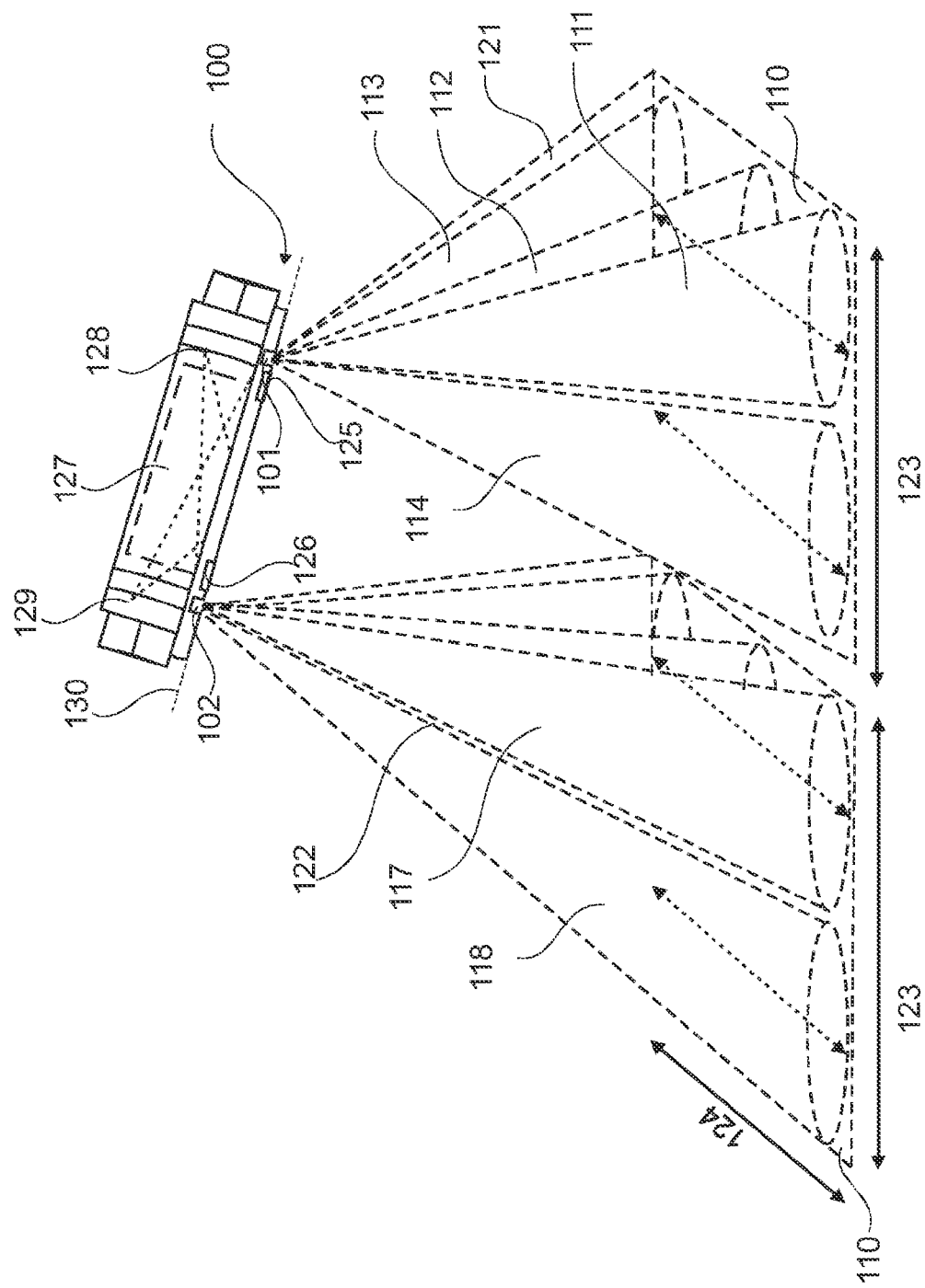
FIG. 1a shows a schematic view of a first embodiment of a supply module having two supply units, each with the supply medium of light or visual information for four-seat rows.

FIG. 1a shows a supply module 100 with two illumination units 101 and 102 which are configured, for a four-seat row, to supply a first supply area 121 and a second supply area 122. Therein, the illumination area 110 to be maximally supplied of the supply area 121 has a width 123 of approximately 100 cm and a length 124 of approximately 150 cm. The measurement of the width 123 is dependent on the row of seats to be supplied (one, two or three abreast) and, for a two-seat row, may amount to approximately 100 cm.

FIG. 1b shows a configuration of a supply module for three two-seat rows which are displaceable depending on the aircraft layout in the direction of the arrow y. The supply module 150 comprises a single illumination unit 103 in the center, by which six individual light cones may be provided in the supply area 121 of the width 123 and length 124.

Different seating positions with subregions 111, 112, 113, 114 configured conically may be illuminated in the supply area 121 of FIG. 1a and 1b as a function of the occupancy situation. For example, illumination unit 101 or 103 may illuminate six different subregions, in which four subregions 111, 112, 113, 114 may be seen as schematic light cones in FIGS. 1a and 1b, and may produce circular subregion areas on illumination area 110. Depending on whether a row with two seats abreast, three seats abreast or four seats abreast is installed, according to the embodiment of FIG. 1a, in addition to the subregions 111 and 114, the subregions 117 and 118 may be activated for reading or for illumination. The respective subregions may be centrally activated by the flight attendant if the tray tables are to be illuminated at mealtimes.

FIG. 1c shows the illumination unit 103 of FIG. 1b in detail. The lighting pattern or the light cone 119 may be implemented by a projection device 160 according to each occupancy situation. The projection device 160 consists of a light source 161, which is extremely bright and may be selected from the group consisting of high-power LEDs or laser light sources.

For regulating the focus and divergence of the light beam (schematically shown by the black arrow head 162), a lens system 163 may be provided. The screen denoted 164 may be configured as a mechanical iris and may comprise heat-resistant metal or glass. Instead of the screen 164, other elements may be used which may vary the color, intensity, size, shape and pattern of the light beam. Possible elements are filters, color wheels or gobo wheels, which may generate specific patterns, images, text, graphics, logos or lighting atmospheres. When using movable elements, the movement may be provided by motorized drives. The element or the screen 164 is easily accessible from the outside, such that if necessary an exchange may be easily carried out.

The projection device 160 shown may be configured as a miniature projector and may have a small overall height of between 6 and 7 cm or less. A small overall height may result in a weight of only a few kg. Saving weight is important in particular in aviation. Furthermore, the projection device 160 comprises control electronics which accept various input signals via the interface 167. The interface 167 is connected to an external system 170 in the embodiment shown. This external system 170 may for example be the CMS of the aircraft. Computer signals or data may for example is received vie this interface and may sufficiently generate pixels for a high resolution surface having a diameter of approximately 37.5 inches (95.25 cm) or approximately 27 inches (50 cm).

The projection device 160 may in particular be used as a data projector or a digital projector. The technology of the projectors may be based on DLP, LCD, CGS (continuous grain silicon) or other technologies. While DLP projectors use the reflection principle, LCD projectors operate according to the rear projection (German "Durchlicht") principle (see also FIG. 6). In DLP technology, digital light processing may be composed of from one to three mirror chips, in order to achieve high pixel densities. DLP systems may prevent a keystone effect by an opto-electronic correction unit.

The illumination units may illuminate circular partial illumination areas by pixel-based control data. Due to the fact that the illumination unit is configured to illuminate in different ways a supply area in a locally differentiated manner based on a plurality of different lighting patterns, it is possible to display not only circular areas, but also a plurality of geometric elements such as squares, hexagons or polygrams as well as graphic symbols. In addition, it is possible to project image information such as a seat number, video information or graphics, onto partial illumination areas or projection planes which may be associated with the respective installed seats and/or another projection surface.

In this manner, a supply unit or a plurality of supply units may provide the illumination supply medium for a respective adjustable subregion within the supply area to be maximally supplied.

An external system 170 may transmit the illumination data, adapted to the respective seating, to the electronics unit or control electronics (shown in FIG. 5 by reference numeral 560) of the illumination unit or projection device 160. The control data may be transmitted via an interface 167 of the projector unit of the supply module 100 from an external system 170 (in FIG. 1c) which is for example configured as a central CMS.

The illumination units 101 and 102 may be activated by the adaptable control surfaces 125 and 126, shown in FIG. 1a. The supply module 100 or 150 is attached to the rail 130 for supply modules, also known as the PSU rail. Arranged inside the supply module 100 according to FIG. 1a is a projection chamber 127 which has two projection units 128, 129 for the rear projection of an item of information on a display surface of the supply module 100. In this manner, in addition to the supply medium light, the supply medium visual information may be made available for the supply areas 121 and 122. This display surface or this display (not shown) for showing visual information may be inclined in the viewing direction of the passengers to provide them with a better view (see FIG. 4b). Furthermore, the display may be fitted with touch-sensitive surfaces which may be used as control surfaces 125, 126 for the reading lights.

Figure 2:
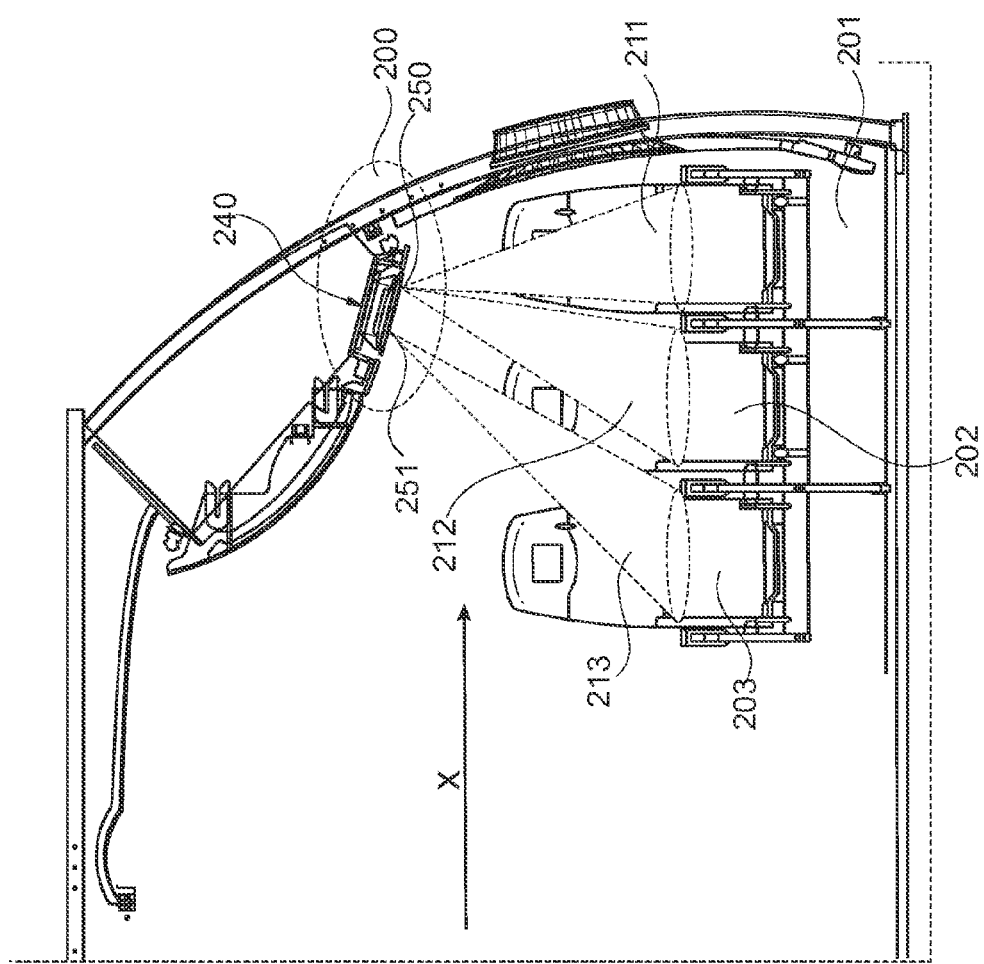
FIG. 2 shows a fuselage cross-section of an aircraft having a further embodiment of a supply module for a three-seat row.

FIG. 2 shows a partial view of a fuselage cross-section of an aircraft having a further embodiment of a supply module 200. An aircraft cabin interior is shown having a three-seat row having folding seats which are fastened to the aircraft floor by a rail. The supply module 200 is mechanically rigidly installed on the supporting structure of the cabin by a PSU rail 240. Furthermore, the supply module 200 is connected to the central supply and a CMS of the aircraft.

In this view, the supply module 200 comprises two illumination units 250 and 251, the light cone or the partial illumination areas 211, 212 and 213 being indicated by dashed lines. The seats, in particular a window seat 201, a central seat 202 and an aisle seat 203 may be illuminated by the first, second or third illumination devices 211, 212 and 213 such that passengers in these seats may be supplied with light for reading. Therein, a single illumination unit 250, 251 may illuminate two or more seats. In the case of a four-seat row, the illumination device 251 may, in addition to the seat 203, also illuminate a further fourth seat (not shown) (see also FIG. 1a). The width of the seat varies according to seat configuration and may be approximately 60 or 50 cm. Therein; the wider seats are business class seats or C-class seats. In a business class arrangement, the second seat 202 may be replaced by a central console and wider seats may be installed on the seat rail.

By suitable screening or masking of the different light cones, adjacent passengers are not dazzled. For masking, a high resolution LCD may be used. It is thus possible to mask different light cones from a fixed and rigidly installed illumination device in a PSU in the X direction (see arrow) and to individually illuminate the laterally arranged seats. Depending on the seating and the purpose of the illumination, the light cones may be directed onto tray tables or other surfaces. This flexible lighting principle may be adapted to the customer requirements of the airline. The aircraft crew may change the lighting or information supply during the flight via a central CMS. For example, the flight attendants may give the impression of daylight. If the rest phase for the passengers is to be encouraged, night lighting may also be simulated.

Figure 3A:
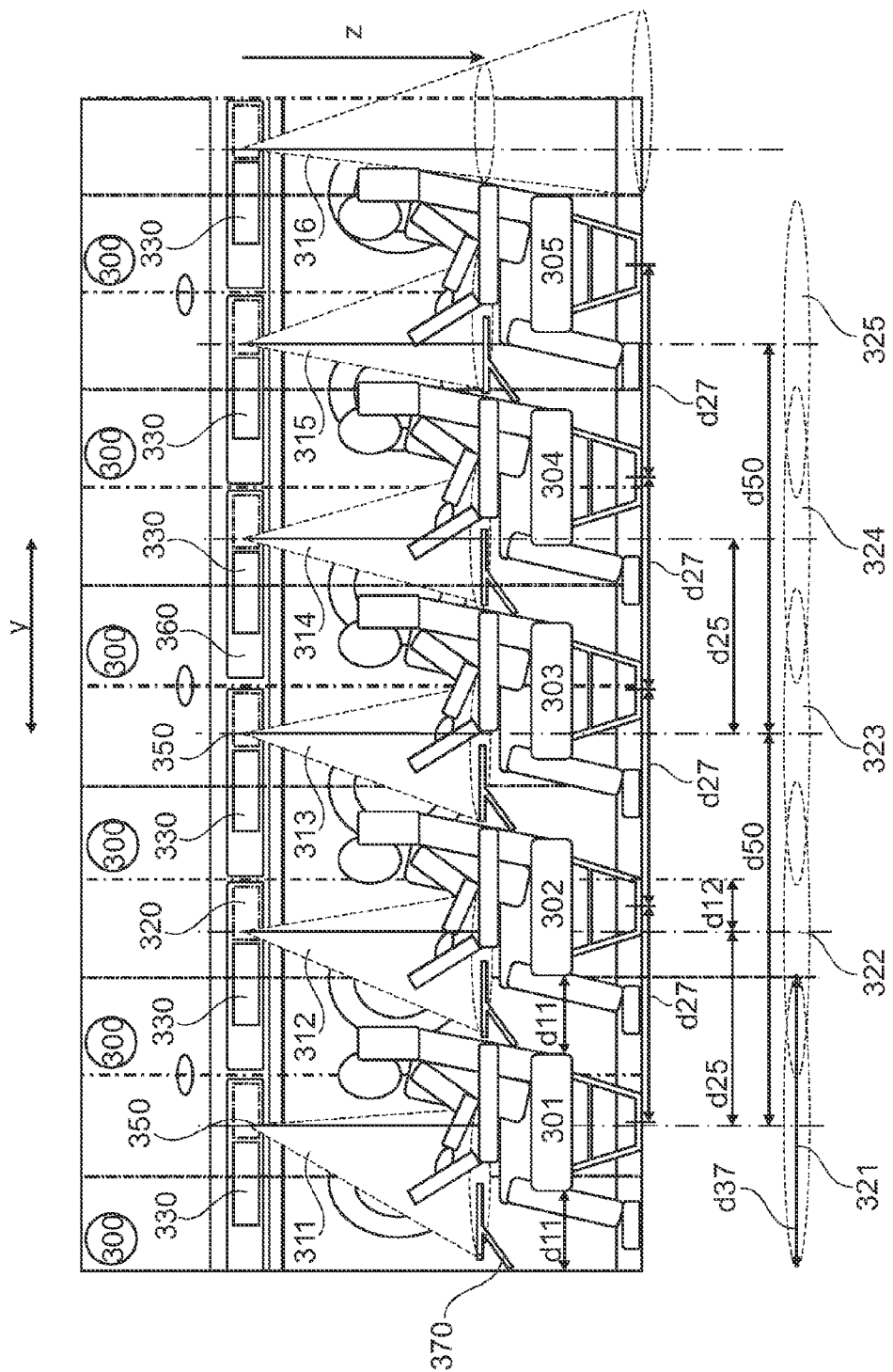
FIG. 3a shows a view of an aircraft along the longitudinal axis of the aircraft having six supply modules and a first seat configuration.
Figure 3B:
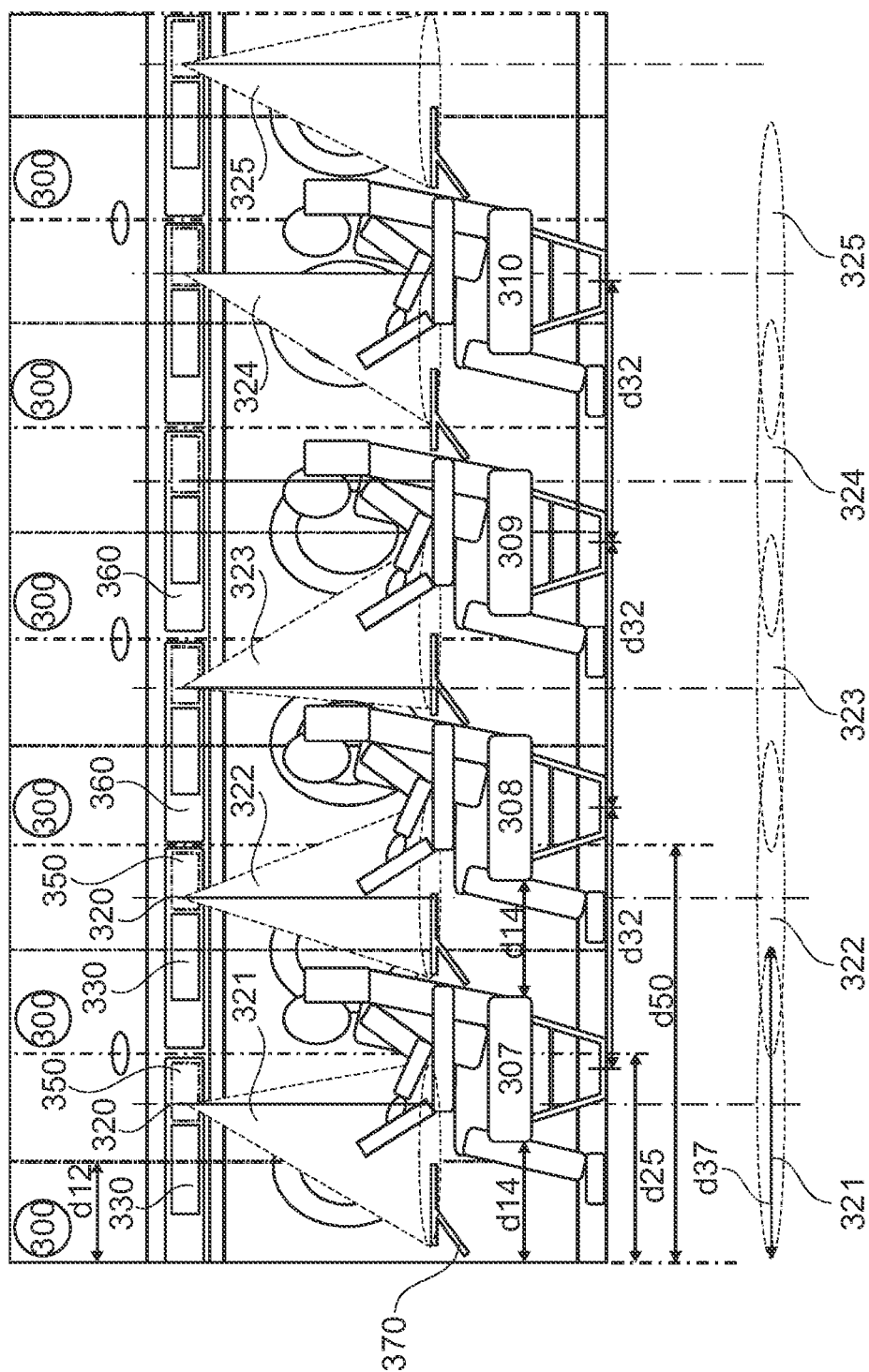
FIG. 3b shows a view of an aircraft along the longitudinal axis of the aircraft having six supply modules and a second seat configuration.

FIG. 3*a*/3*b* show, as in FIG. 2, a region of an aircraft cabin interior, an interior view along the longitudinal axis of the aircraft having six supply modules being shown. In contrast to FIG. 2, which shows the various illuminations in the X direction of the aircraft, in the following figures (FIG. 3*a* and FIG. 3*b*) individual illumination is shown in the flight direction (cf. arrow Y). FIGS. 3*a* and 3*b* differ in that they show two different seat configurations having different seat row spacings, at 27 inches in FIGS. 3*a* and 32 inches in FIG. 3*b*. The operation of the flexible supply module may thus be shown. Both in FIG. 3*a* and FIG. 3*b*, the supply module is installed in the same position in the supply channel. The supply module and thus the flexible illumination unit are preferably positioned in the last half of each frame of the aircraft. In FIG. 3*a* and FIG. 3*b*, the aircraft portions between the frames are denoted by 300 and have a length of 25 inches or 63.5 cm (double-headed arrow d 25). In the center of the aircraft portions 300, display devices or displays 330 are located in the respective supply modules 360. The surface 320 shown by a dashed line comprises the oxygen supply unit. In this region, the illumination units or projection devices 350 are respectively positioned.

In contrast to conventional illumination units or reading lights in the aircraft, which are manually oriented, the illumination units 350 may adjust themselves without manual positioning according to the seat configuration and seat layout of the aircraft. This positioning does not only take place in the case of new seating in the FAL but also between flights (seat quick change). In the case of necessary layout changes, time and costs may be saved by the flexible supply module.

The spacing of the illumination unit is approximately 25 inches or 63.5 cm (see arrows d 25). With this spacing, at a seat spacing of 27 inches or 68.6 cm (see arrow d27), as shown in FIG. 3*a*, each seat row or seats 301, 302, 303, 304 and 305 may be provided with a light cone 311, 312, 313, 314 and 315 for the reading light or for another purpose. This means an individual adaptation of the individual light cones in the y direction (see arrow y). The light cones may also be set or focused to different levels. Therefore, for example, the seat number may be focused on the seat surface of the seat 301, wherein while the seat 301 is occupied the focus may be set to the level of the extended tray table 370. In this manner, an individual reading light may be produced by the illumination unit in the X direction (see arrow x, FIG. 2), Y direction (see FIG. 3*a*, arrow y) and Z direction (see FIG. 3*a*, arrow z). The light cone 316 may also be focused on the floor in the case of seat intermediate spaces (see double-headed arrow d11) or in the aisles, such that the emergency exits may be marked. The maximum light cone diameter in the Z direction is indicated at the bottom edge of the drawing by the dashed ellipsoids 321, 322, 323, 324 and 325 and measures 37.5 inches (arrow d37) or 95.25 cm in diameter. Tests have shown a maximum coverage of approximately 100 cm×100 cm. Using this light cone diameter, at least two seats 301, which are arranged side by side in the X direction, (for example two seats each with a width of approximately 50 cm) may be illuminated in the X direction (not shown) by a single illumination unit 350. Therein, the individual light cone measures approximately 50 cm in diameter per seat.

In FIG. 3*a* it is shown that the orientation of the constructionally identical illumination unit 350 is oriented according to the position of seats 301 to 305. While the light cone 314 above the seat 304 illuminates the tray table 370 almost vertically or the projection surface at right angles, the light cone 311 over the seat 301 is inclined in the direction of aircraft front portion, in order to optimally illuminate the tray table 370 or a passenger's book. If the illumination units 350 are projection devices or miniature projection devices, which are configured to project lettering or other visual information onto the tray table without distortion, an automatic keystone correction is carried out in the electronics unit or PISA of the supply module.

FIG. 3*b* shows a business class seat configuration (307 to 310) having a larger seat spacing of 32 inches or 81.3 cm than the spacing of FIG. 3*a* of only 27 inches. Due to the larger seats, larger individual light cones than in FIG. 3*a* are required for each seat 307 to 310. The diameter of the light cone measures approximately 18.8 inches or 50 cm. For seats wider than approximately 50 cm, larger light cones (not shown) may be used which have a maximum diameter of 100 cm. For optimum illumination of all of the seats 307 to 310 shown, four illumination units or projection devices 350 are required, the supply module arranged directly above the seat 309 not being used in the case shown, in order to prevent possible shadows being cast by the passenger. FIG. 3*b* shows that the same supply units in the same position may optimally produce an illumination different from FIG. 3*a* using the likewise rigidly installed illumination units. In order for the displays or display devices 330 to be better viewed, these may also be configured obliquely (see FIG. 4*b*).

The rigidly installed supply module and the projection devices rigidly installed therein are generally installed in a strategic position such that all possible occupancy situations are covered. Depending on the aircraft type or the position in the aircraft, supply modules may be equipped with only a single projection device or two projection devices.

Figure 4A:
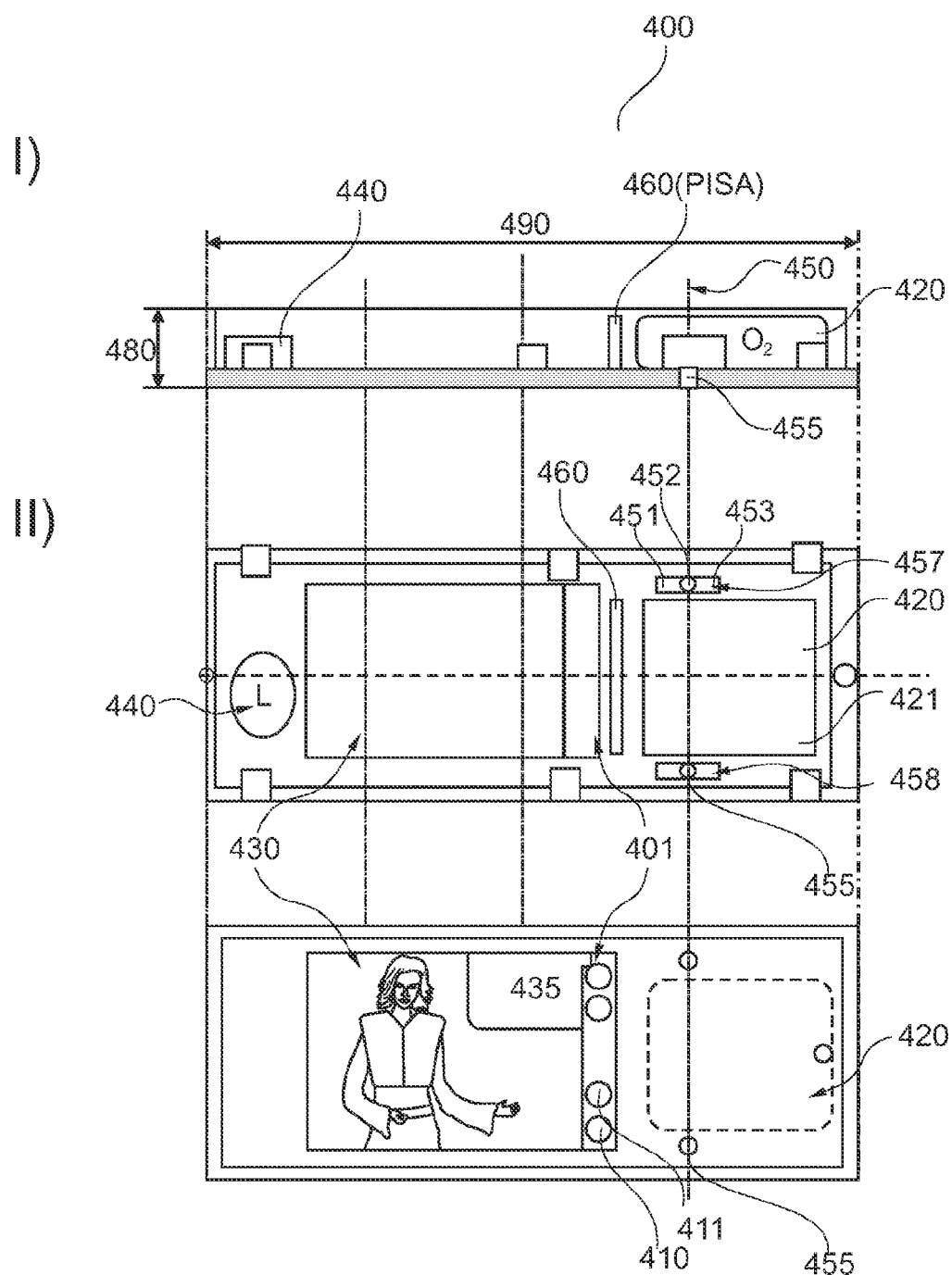
FIG. 4a shows a schematic side view (I) and a plan view (II) of a further embodiment of a supply module.

FIG. 4*a* shows in detail a side view I) and two plan views II) of a supply module 400. The supply module has a length 490 which corresponds to the standardized dimensions of the supply module channels which are usual inside an aircraft. For example, the length 490 of the module may be 25 inches, which approximately corresponds to 63.5 cm or to the length of half an overhead compartment or of a three-abreast row in economy class.

The height 480 of the supply module may be 10 cm or 9 cm, for example. Therein, the height 480 of the supply module depends on the supply unit which has the greatest depth. In the supply module shown, this is an oxygen mask container 420 which may have an oxygen mask or an oxygen generator. Depending on the number of masks to be accommodated, for example, one to four masks, connections for respective hoses are provided. Therein, a plurality of hose lines may be guided together through a single coupling and guided out of the oxygen mask container 420 through a single line. The connection connects the oxygen masks to the emergency oxygen supply in the PSC (not shown in FIG. 2).

The oxygen mask container 420 may be configured such that it may be attached by simple movements in the retainer in the supply module, for example by Velcro® fasteners, which may be arranged in different areas of the supply module. Furthermore, it is possible to lock the oxygen mask container into available corresponding retainers on the supply module using snap-on connections.

Furthermore, a cover 421 closes the oxygen mask container 420 (cf. plan view II)). The visible side of the cover 421 may be used as an additional display surface for items of information. Thus, notifications such as "Return to Seat", "No Smoking" or "Fasten Seatbelts" may be presented on this display unit. By the CMS (not shown), activation via an external system may automatically open the flaps of the oxygen mask containers 420 in the event of an emergency. In emergencies in which the supply is no longer provided by electric current, a device is provided, for example a tab, which ensures that this safety element may be opened manually. After electronic activation of the oxygen supply unit or following a manual pulling of the tab, the flap opens and the passenger oxygen masks fall down, suspended from the respective hose. After the oxygen masks have fallen out of the container, they may be reached easily by the passengers. Therein, the oxygen masks may be located at the side of or also in front of the passengers.

Positioned on the dash-dotted line 450 which joins FIGS. 4I and 4II are illumination units 455 and 452. The adaptable illumination surfaces 457 and 458 may be adapted, depending on seating position and occupancy situation. For example, activation surfaces 451, 453 for the left-hand and right-hand outer seats of the seat row to be supplied may be provided. The illumination surfaces 457 and 458 are configured such that different seats may be illuminated by a single illumination unit 455.

Furthermore, a suitable detection means may be integrated into the supply module 400. This may for example be configured as an infrared sensor or another camera technique, which may detect an operation of the supply module and may transmit it to the controlled elements.

FIG. 4*a* also shows the PISA 460 comprising the electronics unit and interface of the supply module. For example, the control surfaces may be connected to the supply units to be controlled and may be activated via PISA 460. The display device 430 occupies the largest area of the supply module. For this purpose, both multi-colored and monochrome displays are suitable which ensure readability under light conditions provided in an aircraft. To ensure adequate visibility, background lighting may be provided. Possible technologies for displays may be LCDs, LED displays, an OLED display, an FED, micro-displays, and others.

The display device 430 may be used for items of sign information and for directional signs for passengers. In an extended version, larger displays may also be integrated into the supply module. In this manner, animated graphics-based videos, video or text-based items of information may be displayed. In the illustrated picture example, a stewardess is giving the passengers safety information about the flight.

The pictograph display 435 may be animated, may be modified in size or may also occupy different positions on the entire display field which is possible in the supply module. One or more pictographs are possible per sign surface. The sign surface may thus be used in a flexible manner depending on the content to be displayed. Short video sequences or additional contents such as multilingual subtitles may be displayed. Current data may be displayed via the CMS. Therein, the display device 430 is colored and weighs as little as possible. In the panel adjoining the display device 430, a control surface 401 is arranged which may be provided as a touch-sensitive surface, for example to accommodate call buttons for flight attendants or other circuits. For example, the control surfaces 410 and 411 may be circuit elements for the illumination units 452 and 455.

Furthermore, the supply module has a loudspeaker 440 to allow the output of acoustic signals. An audio processing unit may be provided which, for example, makes MP3 decoding available as a function. A music video may also be shown in combination with the display device 430. If special customer preferences for a specific selected a seat are known in advance, it is possible to upload appropriate music or game tools. Therein, the necessary data may either be provided from an internal control unit of the supply module or by the CMS. The advantage of using the CMS is that current data may be displayed.

Figure 4B:
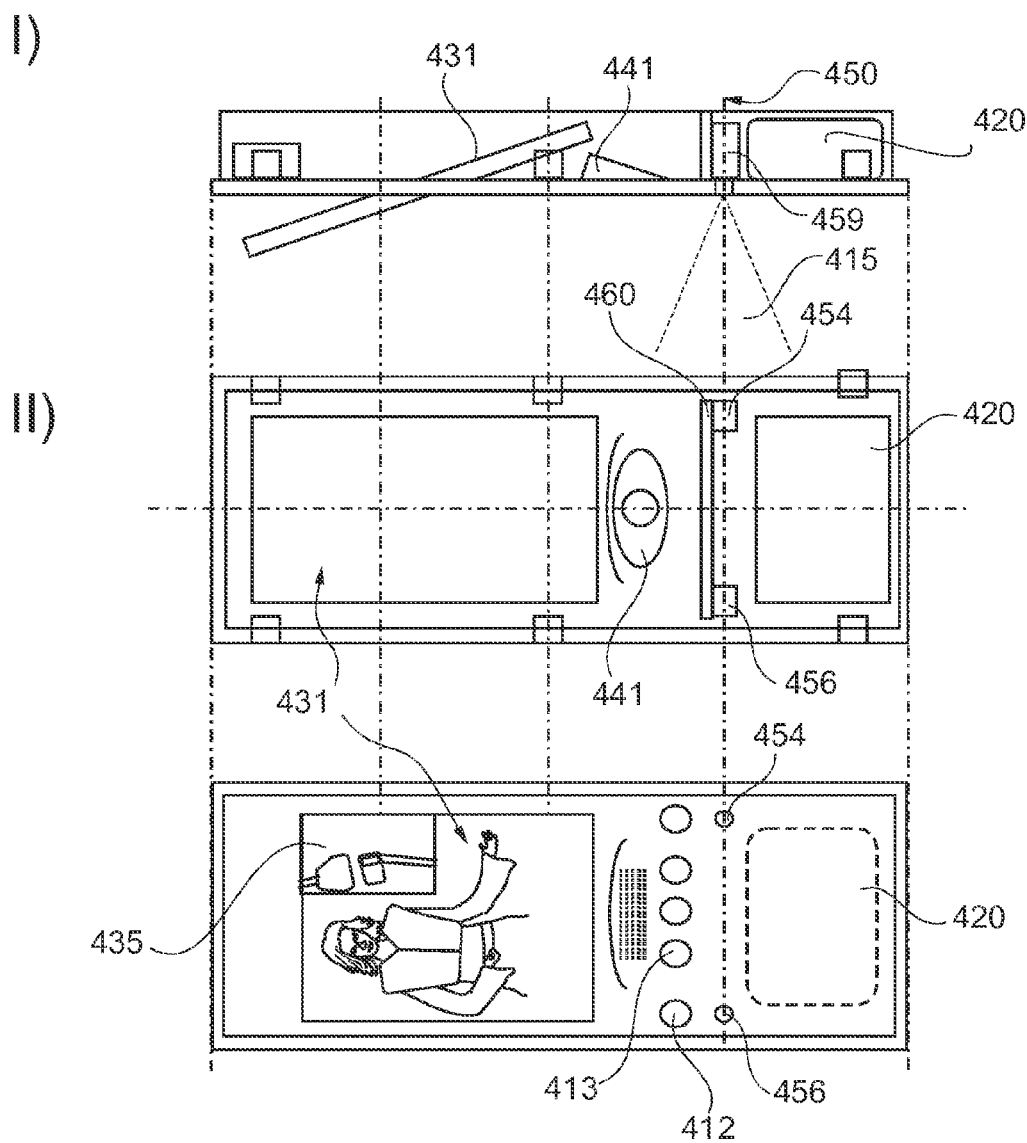
FIG. 4b shows a schematic side view (I) and a plan view (II) of a further embodiment of a supply module having a tilted display device.

Individual air showers may optionally also be provided which may be installed, for example, in the area above the loudspeaker 440 which is still available. FIG. 4*b* shows, as in FIG. 4*a*, a side view I) and two plan views II) of a further embodiment of the further supply module 400, identical reference numerals denoting identical features as those in FIG. 4*a*. The display device 430 is inclined such that may be easily viewed by the passengers both from the right-hand side and the left-hand side. Zebra effects may be prevented.

A loudspeaker 441, which may receive audio signals via the electronics unit or PISA 460, is arranged between the display device 431 and the control surfaces 412, 413, which may be configured as interactive touch areas. The illumination unit 459 is configured as a miniature projection device or a pico projector having maximum height of 10 cm. Side view I) of FIG. 4*b* shows a light cone starting from a single illumination unit 459. Using this single illumination unit 459, which may have a high-power LED or a laser as a light source, a space of 100 cm by 100 cm may be illuminated with a maximum light cone 415. Up to three economy seats which are side by side (see also FIG. 1*a*) may thus be illuminated.

By only a single illumination unit or two illumination units per supply module, a plurality of seat illumination configurations may be controlled by a central management system. Corresponding data may also be buffered in a decentralized manner in the PISA. The maintenance of this flexible supply module is low, since it only has to be installed once and is easy to clean. A modern design together with components such as touch screens and overhead video enhance the cabin facilities. Cable is saved in the supply channel due to the use of the flexible supply module. The components of the supply module are, in the same way as the miniature projection devices as illumination units, configured to be compact and thus save on weight.

Figure 5:
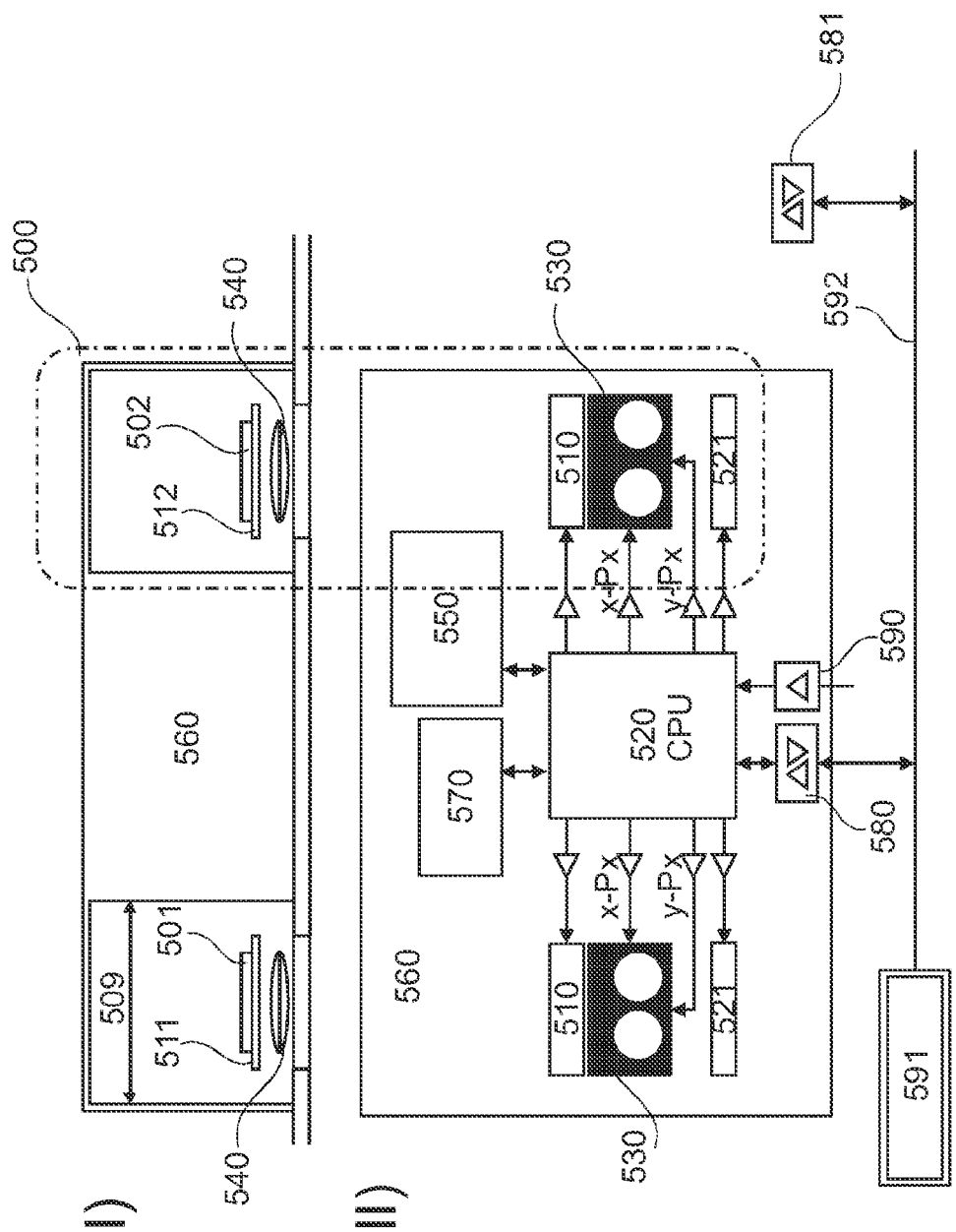
FIG. 5 shows a schematic illustration of the electronic control of the supply module.

FIG. 5 shows a technical implementation and the construction of the electronics unit (PISA) of a further embodiment of a supply module. The side view denoted by I) shows a detail of the supply module. The supply module shown shows two miniature projection devices (of which the right-hand device is indicated by reference numeral 500). The height and width 509 of the miniature projection devices 500 is approximately 9 cm. The control electronics 560 are equipped with the light sources 501 or 502 between the two miniature projection devices 500.

The light sources 501, 502 may be a single high-power LED, laser or a super luminescent LED. An LCD surface 511, 512 such as a mini color LCD may be arranged directly below the light sources. The high-resolution LCDs 511, 512 may each be used for masking the light source 501. Regions may thus be covered and desired lighting patterns or light cones may be generated. A lens system 50 having a lens is further arranged in the beam direction. Two further lens systems are shown in detail in FIGS. 6a and 6b.

In section II of FIG. 5, an implementation diagram is shown which shows the construction of the PISA electronics unit. The central unit of the electronics unit 560 is the control unit 520, which may comprise a CPU. In this unit, a field programmable gate array (FPGA) may be provided in order to implement different circuits.

The control unit 520 receives input data 550 from the diverse circuit surfaces (light on/off or dim, flight attendant call button, loudspeaker). Furthermore, a memory unit 570 is contained in the PISA, which memory unit may likewise relay data to the control unit 520 (see double-headed arrow between 520 and 570). The occupancy situation of the aircraft is stored in the memory unit 570, it being possible for data such as orientation, number of light cones or partial illumination surfaces, shape and color, with lettering and images etc., to originate from the outside from a CMS. Furthermore, the digital content of the display device may be stored in the image memory of the memory unit 570. A video server may serve to provide image content and videos.

The received data serve to control the illumination unit 510, a display device 530 and a micro-lens system 521. The micro-lens system 521 is used as a zoom adjustment unit. Control data are sent from the control unit to the display device 530 such that x and y pixels may be generated. The pattern shown in FIG. 5 has two circular illuminated surfaces. Depending on the received pixel signals, different illumination patterns, colors, lettering, images or videos may be shown. Using this system, a high-resolution pixel arrangement (HD) may be provided. The projection technology may be based upon LCD technology or micromirror devices of DLP technology.

Since the central control unit may control more than one miniature projection device 500, the use of the control electronics integrated into the PISA is particularly effective for the projection units. The PISA may be used either in a decentralized manner or in combination with an external central CMS. A suitable interface for the data bus of the CMS is shown by the schematic double-headed arrow 580. The CMS data bus connects the PISA 560 of the supply module to the data of the cabin layout, which for example may be retrieved from a storage medium such as flash cards, SD cards or CAM. Further interfaces 581 are provided in order to connect other supply modules or other elements to the central CMS. The supply module or the PISA is supplied with current via the input 590.

FIG. 6a and FIG. 6b schematically show two methods of optical control. FIG. 6a shows a light source 601 having a primary lens 602 and a fixed focus lens 603. This principle makes it possible to illuminate the entire dashed light cone 604, four focus surfaces 605 of approximately the same size being able to be generated above the seats 606 by suitable adjustment.

FIG. 6b, however, shows a principle in which a kinematically flexible focus lens 612 is arranged according to the light source 610 and the primary lens 611 and may be moved by a servomotor 613. The drawing shows three different adjustments of the lens. In this case, four different seats 606 may also be illuminated. However, four seats may not be simultaneously illuminated, such that only one seat position may be supplied per light source.

Figure 7:
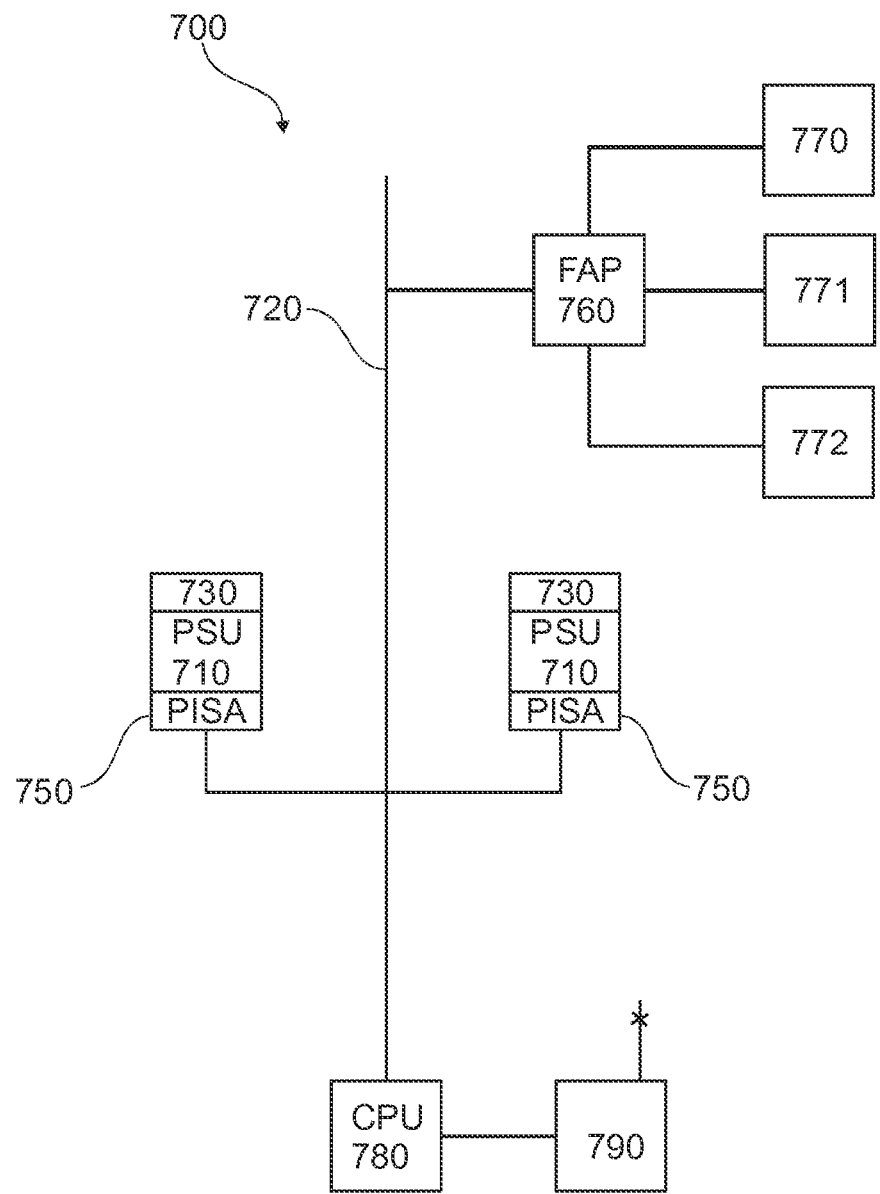
FIG. 7 shows a schematic illustration of a network for a supply module with a CMS.

FIG. 7 is a schematic illustration of a network 700 to illustrate the external control of the supply modules 710. Each supply module 710, also called a PSU, has a PISA 750 and a display device 730. Further supply units such as illumination units, control surface units, loudspeakers or the like are contained in the supply module, but are not shown in FIG. 7. Each of the supply modules 710 is connected to a data bus 720 of the CMS. The CMS has a central processing unit 780 and may be connected to an external Satcom installation 790, for example, to receive current data. The central processing unit 780 may be used for programming the supply modules and may for example also signify a FPGA, ASIC etc. For example, a microprocessor may be programmed using programming languages such as ASIC based on an occupancy situation. FPGAs may be used as programmable logical circuits.

For the display device 730, a device stationed on the ground allows the airlines to select and configure in advance the necessary information, such as cabin layout or other items of information. Furthermore, it is possible to define the information before the flight, such as items of flight information, scheduled arrival time or names of the crew. Items of safety information, advertising or items of airport information as well as gates for connecting flights and corresponding gate changes may also be specified in advance. Pre-programmed items of information may contain usual fasten seatbelt signs as well as airline logos or seat row numberings, for example.

Using the CMS, subject to the occupancy situation, for example the different cabin zones such as business class or economy class, it is possible to realize different information contents for the corresponding supply modules. Thus, particular items of information for first class passengers, such as special advertising offers or menus as well as stock exchange prices may be shown on the display devices 730. Furthermore, an addressing mechanism of the individual seats may address the seats individually, as a result of which the occupant of the seat may be addressed directly. The items of information required for this purpose may be taken from the CMS.

Informative and entertaining items of information may be displayed on the display devices 730 in addition to safety-relevant signs such as "Fasten Seatbelts" or no smoking signs. Such information includes, for example, current news, airport information, weather reports, items of safety information, advertising etc. By a suitable display device 730, the contents may also be presented in several languages with corresponding ticker texts or subtitles. In this respect, suitable control surfaces are to enable the passenger to make a flexible choice between the programs.

Furthermore, flight attendant-based items of information may be transmitted via a control panel of an FAP unit 760. The FAP may have, for example, a keyboard or other input facilities such as a touch screen in order to also be able to transmit controls to the supply module. Specific data may also be input into the system by the FAP 760. Included as storage media are, for example, external drives 770 or memory cards 771, memory sticks 772 or other storage media which may be simply connected to standardized interfaces of the FAP.

Storage media may also be connected to the central processing unit 780 to centrally output commands as a function of the occupancy situation. The possible occupancy situations may be stored in the central computer and retrieved on the ground before the flight. In this manner, the PSUs 710 may be easily controlled via the electronics units or PISA 750 of the PSU. In another embodiment, the flight attendant unit 760 and the central processing unit may be combined in one appliance unit as a computational control unit.

Figure 8:
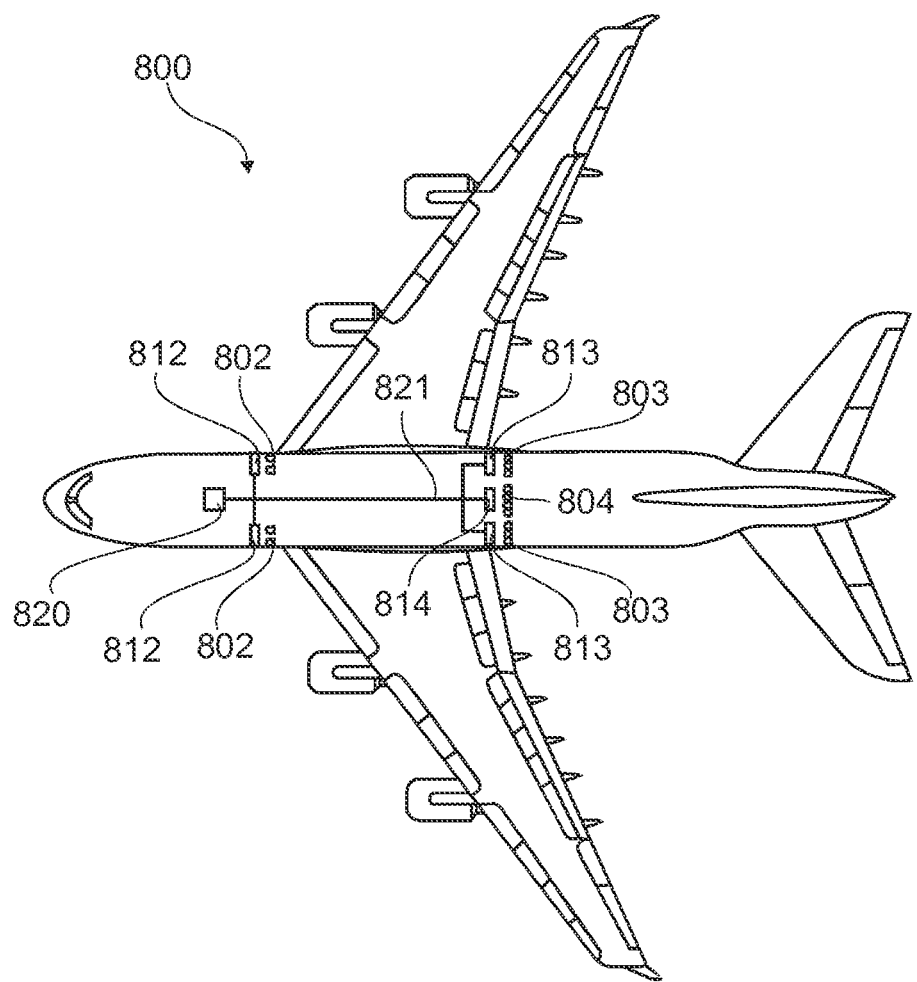
FIG. 8 shows an aircraft with supply modules for a two-class cabin layout.

FIG. 8 shows an aircraft 800 having a two-class cabin layout. In first class or business class, seats two abreast 802 and in second class or economy class, seats three abreast 803 or four abreast 804 are made available to the passengers. For all types of seat rows, a supply module 812, 813, 814 may be used which is adapted in each case to the seating configurations. A data bus system 821 connected to a central control unit 820 may control the supply modules 812, 813, 814 and transmit different items of information as a function of the class. Therein, the individual supply modules 812, 813, 814 have display devices which may be seen from all seats of a row, regardless of whether they are arranged on the right or on the left relative to the display. If the seats are moved or the seat spacings are increased, the display may be easily seen and the control surface may be easily operated by the passenger, regardless of his seat position (R/L), via an electronic control.

Figure 9:
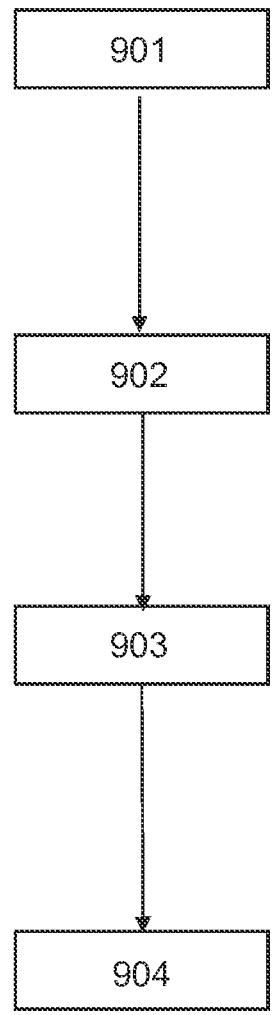
FIG. 9 shows a schematic illustration of the steps of a method for operating a supply module for supplying occupants of a vehicle.

FIG. 9 schematically shows the steps of a method for operating a supply module for supplying occupants of a vehicle. The method starts in the first step 901. That is to say, for example, that a supply module or one or more supply units is activated and, for example, is set to receiving mode. In a second step 902, control data from an external system relating to a predeterminable occupancy situation is received by a supply module. The supply module is connected to the external cabin management system via an interface. In step 903, a first supply unit of the supply module for supplying passengers with a supply medium in a first subregion of a first supply area is activated by the external system.

Step 904 may take place at the same time as step 903 or after the first activation and comprises an activation of a second supply unit of the supply module for a supply with a second supply medium in a second subregion of a second supply area by the external control unit or external system based on the received data. If the first supply unit is a control surface which is configured to activate an illumination, in step 903 a respective reading light may be activated by two passengers. Thereafter, a second supply unit which provides the supply medium of light may supply the requested seats with reading light as a function of the occupancy situation. Steps 901 and 904 are optional. For example, the supply units may be continuously active, such that activation in step 901 is unnecessary.

Depending on the number of supply units which are integrated into the supply module, different supply media may be offered to the passengers. Therein, the flexible supply module offers a complete service for the duration of the flight and is available to the passenger's right up until the aircraft lands and until the passengers leave the aircraft.

It is pointed out that that the term "comprise" does not exclude further elements of method steps, just as the term "a" or "an" does not exclude a plurality of elements and steps. The reference numerals which have been used are merely to enhance the understanding of the invention and are in no way to be considered as restrictive. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A supply module for a passenger transport vehicle, the supply module comprising:
    a first supply unit configured for a supply with a first supply medium in a first supply area;
    an interface to an external system configured to receive a predeterminable occupancy situation;
    a central control unit configured to save the predeterminable occupancy situation;
    wherein the control unit is configured to centrally activate the first supply unit in a first subregion of the first supply area and in a second subregion of the first supply area based on the predeterminable occupancy situation; and
    wherein the predeterminable occupancy situation is representative for a seating configuration in the passenger transport vehicle.

2. The supply module according to claim 1, wherein the first supply medium is visual information.

3. The supply module according to claim 1, the supply module further comprising:
    a second supply unit configured for a second supply with a second supply medium in a second supply area; and
    wherein the control unit is configured to activate the second supply unit in a second subregion of the second supply area based on the predeterminable occupancy situation.

4. The supply module according to claim 3, wherein the first supply area and the second supply area are configured for a substantial consistency.

5. The supply module according to claim 1, wherein the first supply unit comprises a display device that is configured to display symbols, pictographs, characters, videos or other items of information depending the predeterminable occupancy situation.

6. The supply module according to claim 1, wherein the first supply unit comprises at least one control surface that is configured to activate the at least one control surface depending on the predeterminable occupancy situation and to transmit an activation by a sensor.

7. The supply module according to claim 1, wherein the supply module comprises an electronics unit with a storage element that is configured to store at least one predeterminable occupancy situation.

8. The supply module according to claim 1, wherein the first supply unit is an illumination unit that is configured to illuminate partial illumination areas based on the predeterminable occupancy situation.

9. The supply module according to claim 1, wherein the first supply unit comprises a projection unit that is configured as a miniature projection device and is configured to project image information with at least one activated partial illumination area.

10. The supply module according to claim 9,
    wherein the miniature projection device comprises at least one light modulation element.

11. The supply module according to claim 7, wherein the electronics unit is arranged locally in the supply module and comprises the control unit in order to control at least one supply unit and one miniature projection device.

12. The supply module according to claim 1, wherein the passenger transport vehicle is an aircraft.

13. A method for operating a supply module for supplying occupants of a vehicle, comprising:
- receiving data from an external system concerning a predeterminable occupancy situation, the occupancy situation being representative for a seating configuration in the passenger transport vehicle;
- saving the predeterminable occupancy situation in a central control unit; and
- centrally activating a first supply unit of the supply module for a supply with a first supply medium in a first subregion of a first supply area and in a second subregion of the first supply area based on the data.

14. A non-transitory computer readable medium embodying a computer program product, said computer program product comprising:
- an operating program for operating a supply module for supplying occupants of a vehicle, the operating program configured to:
- receive data from an external system concerning a predeterminable occupancy situation, the occupancy situation being representative for a seating configuration in the passenger transport vehicle;
- save the predeterminable occupancy situation in a central control unit; and
- centrally activate a first supply unit of the supply module for a supply with a first supply medium in a first subregion of a first supply area and in a second subregion of the first supply area based on received data.

15. The supply module according to claim 10, wherein the at least one light modulation element is a digital light processor (DLP) having a plurality of micromirrors.

16. The supply module according to claim 6, wherein the sensor is a capacitive sensor.

17. The supply module according to claim 1, wherein the first supply unit comprises at least one control surface that is configured to activate the at least one control surface depending on the predeterminable occupancy situation and to transmit an activation by an interactive touch surface.

18. The supply module according to claim 1, wherein the first supply unit comprises at least one control surface that is configured to activate the at least one control surface depending on the predeterminable occupancy situation and to transmit an activation by a scanner.

* * * * *